United States Patent
Mattsson et al.

(10) Patent No.: US 9,473,985 B2
(45) Date of Patent: Oct. 18, 2016

(54) UE SELECTIVE CONTROL OF DOWNLINK DATA

(71) Applicant: Telefonaktiebolaget L M Ericsson (publ), Stockholm (SE)

(72) Inventors: Ulf Mattsson, Kungsbacka (SE); Björn Bodén, Sunne (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/761,731

(22) PCT Filed: Jan. 18, 2013

(86) PCT No.: PCT/EP2013/050927
§ 371 (c)(1),
(2) Date: Jul. 17, 2015

(87) PCT Pub. No.: WO2014/111153
PCT Pub. Date: Jul. 24, 2014

(65) Prior Publication Data
US 2015/0365846 A1    Dec. 17, 2015

(51) Int. Cl.
| | | |
|---|---|---|
| H04W 4/00 | (2009.01) | |
| H04W 28/12 | (2009.01) | |
| H04W 8/18 | (2009.01) | |
| H04L 29/06 | (2006.01) | |
| H04L 29/08 | (2006.01) | |
| H04W 4/20 | (2009.01) | |
| H04W 68/00 | (2009.01) | |

(52) U.S. Cl.
CPC .......... *H04W 28/12* (2013.01); *H04L 63/0236* (2013.01); *H04L 67/04* (2013.01); *H04W 4/20* (2013.01); *H04W 8/18* (2013.01); *H04W 68/005* (2013.01)

(58) Field of Classification Search
CPC ...... H04W 4/14; H04W 4/12; H04L 12/5895
USPC ............. 455/466, 410, 411, 422.1, 418
See application file for complete search history.

(56) References Cited

U.S. PATENT DOCUMENTS

| | | | | |
|---|---|---|---|---|
| 8,526,981 B2* | 9/2013 | Shaheen | ............. | H04L 12/5895 455/453 |
| 2009/0318130 A1* | 12/2009 | Naylor | ................ | H04L 12/2602 455/423 |
| 2011/0092202 A1* | 4/2011 | Mattisson | ........... | H04L 12/2697 455/425 |

FOREIGN PATENT DOCUMENTS

| | | |
|---|---|---|
| WO | 01/33889 A1 | 5/2001 |
| WO | 02/23831 A1 | 3/2002 |
| WO | 2005/015874 A2 | 2/2005 |
| WO | 2011/162667 A1 | 12/2011 |

OTHER PUBLICATIONS

International Search Report and Written Opinion for Application No. PCT/EP2013/050927, mailed Dec. 19, 2013, 21 pages.

* cited by examiner

*Primary Examiner* — Nghi H Ly
(74) *Attorney, Agent, or Firm* — Nicholson De Vos Webster & Elliott LLP (57) ABSTRACT

The present invention relates to control of downlink data in a packet based telecommunications network and in particular to UE control of downlink data. This is provided in devices and methods for handling such control, for instance a user equipment (101), UE, in a telecommunications network (100). The UE has an associated Internet Protocol, IP, address. The UE comprise at least one processing unit (201), at least one computer readable storage unit (202), at least one communications interface (203), and wherein the processing unit is arranged to execute instructions sets stored in the storage unit for determining that only some downlink data is to be received on the communication interface and sending a message using the communication interface to an infrastructure node (103, 104) indicating that downlink data is to be filtered depending on type of service when transferred to the UE.

16 Claims, 6 Drawing Sheets

UE SELECTIVE CONTROL OF DOWNLINK DATA

CROSS-REFERENCE TO RELATED APPLICATIONS

This application is a National stage of International Application No. PCT/EP2013/050927, filed Jan. 18, 2013, which is hereby incorporated by reference.

TECHNICAL FIELD

This invention relates to control of downlink data in a packet based telecommunications network and in particular to UE control of downlink data.

BACKGROUND

Mobile wireless communication in the form of telephony and data connections has become an essential part of our lives and in many ways replaces the fixed connections we have been used to for the past decades. In some parts of the world people and machines is becoming connected with each other only via mobile solutions and not via fixed connections, such as for instance in developing countries but also to some extent in the developed countries.

Usage of wireless telecommunication networks is increasing dramatically over time and the behaviour changes as we shift the volume of traffic from voice to use of data traffic in the telecommunication networks. This is true both for applications requiring access to packet based networks, such as browsers, email communication, cloud based storage, and so on, and for voice related applications as Voice over IP (VoIP) applications. This increase of data traffic sets up demands on the networks to handle large volumes of data traffic and with an always connected situation our devices are always connected to a packet data network, e.g. the Internet connected to different applications. Because of the limited access to wireless infrastructure, cell congestion, device battery life, and similar resource management issues, there is therefore a need for regulating the amount of data traffic in the networks.

In a roaming scenario, i.e. when the user device (UE) is connected to a network of a network operator different from the one that the user has a subscription with, there is also charging issues to be taken into account. The user does not want to get charged for traffic data that the user is aware of or has initiated. The same applies for situations where the user has a subscription where data traffic costs are incurred based on amount of data transferred.

In 2G/3G/4G networks the UE may be provided with an Internet protocol (IP) address for connection to an IP based network and for sending data and receiving data. In such a scenario downlink data will be directed to the UE from any service located on the packet data network connected to the UE even if the UE is active or inactive.

There are situations when it is big advantage to the end user to block most IP traffic and only receive some IP traffic from selected hosts or services. Typical use cases when one would like to enable communication with only selected hosts/services are:

When roaming, one would like to be able to for instance send or receive mails but no other traffic in order to keep the roaming costs low. If this is introduced in an operator's network, it would make the users dare to stay connected to certain services also abroad and therefore consume some data. This will increase Mobile network operators (MNO) revenue compared to today when most users have their data connections turned off while roaming.

When the phone/tablet/PC enters a low-power mode, only wake up on incoming mails or VoIP calls to reduce power consumption.

A Machine to Machine (M2M) device would only like to be reachable from a certain host to reduce power consumption and increase security by using filtering in a suitable communication infrastructure node as a firewall Parent control. Parents would like to restrict what their children can access on the internet. The reason can be because of a cost perspective (e.g. streaming Spotify costs a lot) and also be able to block certain services not fit for children.

There is no solution today where the UE can request a mobile network to apply gating/filtering functionality for the use cases described above.

The UE may comprise a terminal equipment (TE) and a mobile terminal (MT) and some existing solutions for the TE is to instruct a mobile terminal (MT) to only delivery selective data are expected to result in that a filter is applied in the MT but that arbitrary data is received from the wireless IP network to the TE.

Parental control could be introduced in UEs by firewalls in the OS of the UE. The firewall could then be configured to only let specific traffic through. However, there are no such solutions in key UE operative systems of today. Once again, a firewall in the UEs would also result in unnecessary traffic being sent to the UE.

SUMMARY

It is a first object of the invention to remedy or at least alleviate some of these drawbacks. This is provided in a number of aspects in which as first is a user equipment (UE) in a telecommunications network. The UE has an associated Internet Protocol (IP) address. The UE may comprise at least one processing unit, at least one computer readable storage unit, and at least one communications interface. The processing unit may be arranged to execute instructions sets stored in the storage unit for determining services for which data is to be filtered on the communication interface, setting up a filter configuration comprising information about which services to filter and sending a communication control message using the communication interface to an infrastructure node indicating the services to filter by providing the filtering configuration to the infrastructure node.

In some cases the processing unit may be further arranged to execute instruction sets for receiving a paging signal comprising information about the type of downlink data to be transferred from the infrastructure node, check a filter list in the UE, and in response to the paging signal sending a message indicating acceptance or no acceptance for receiving the downlink data.

The communication control message may comprise a control message used for handling communication processes between the UE and the infrastructure network and the communication control message further comprising information related to the services to filter.

A fast dormancy signal may be used to transfer an indication to start filtering of downlink data by providing a flag in the fast dormancy signal. Use of a fast dormancy signal is advantageous since this is a signal part of a used standard.

The filter configuration may comprise at least one of Internet Protocol, IP, 5 tuples, IP patterns, hyper text transfer protocol, HTTP, headers, or file transfer protocol, FTP, headers.

Another aspect of the present invention is provided, a method in a user equipment, UE, in a telecommunications network. The UE has an Internet Protocol, IP, address. The method may comprise steps of determining that downlink data for services is to be filtered, setting up a filter configuration, sending the filter configuration to an infrastructure node as part of a communication control message, detecting a trigger event in the UE for starting of filtering of downlink data and indicating to the infrastructure node that the filter configuration is to be applied in the infrastructure node.

The trigger event may be one of idle status of UE, roaming of the UE, remaining battery charge, user activated, or network load.

Yet another aspect of the present invention is provided, an infrastructure node in a telecommunications network. The node may comprise at least one processing unit, at least one computer readable storage unit, and at least one communications interface. The processing unit may be arranged to execute instructions sets stored in the storage unit receiving a filter configuration in a communication control message from a user equipment (UE) associated with an Internet protocol, IP, address, indicating services to filter communication towards the UE, and filtering downlink data on a service level towards the UE in accordance with the filtering configuration.

In this manner the UE will not receive any downlink data that it has indicated as it does not want to receive and therefore reduce costs incurred for instance in a roaming scenario however retaining the allocated IP address and therefore able to send uplink (UL) data when so wanted.

The UE and/or any external devices may reduce battery energy consumption and thus prolong the life time of the battery between each charging.

Furthermore, with this solution control and data signalling may be reduced in the network thus decreasing the load on the network.

The ability for the UE to have selective control of the downlink data will also advantageously help reducing signaling in the mobile network. This will be beneficial for a mobile network operator (MNO), especially in a machine to machine (M2M) case where there may be many devices communicating with the network and with a fixed set revenue for the MNO.

Further advantages of the invention will appear from the following detailed description of the invention.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
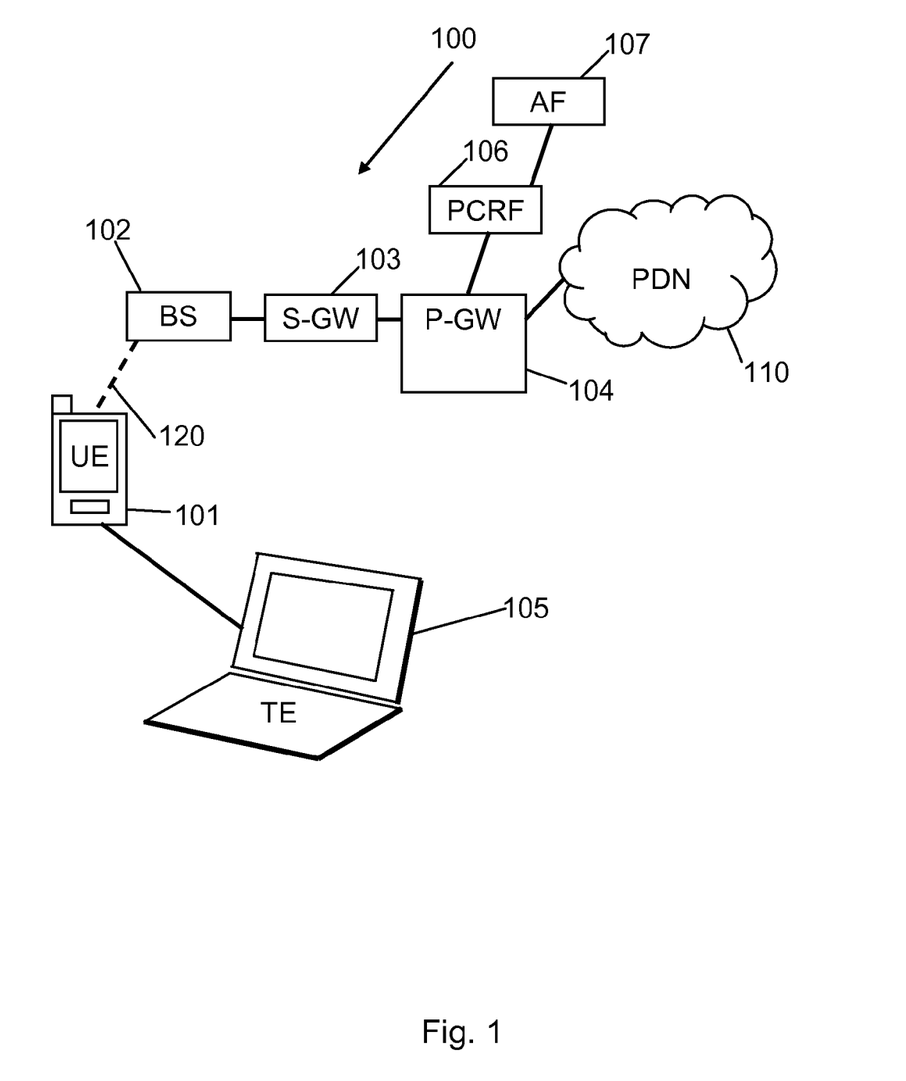
FIG. 1 is a schematic block diagram illustrating a network according to a first embodiment of the present invention.

In FIG. 1 reference numeral 100 indicate a packet based telecommunications infrastructure network according to the invention. A user equipment (UE) 101 communicates via a wireless communication link 120 with a radio access device (BS), e.g. a base station or an eNodeB (eNB) 102 which in turn communicate with the network via a serving gateway (S-GW) 103 or an SGSN and an Internet gateway, e.g. a GGSN, a Packet data network gateway (P-GW), or an evolved packet data network gateway (EPG) 104. A Policy and charging rules function (PCRF) device 106 is connected to the P-GW for providing policy and charging rules and the PCRF is in turn optionally connected to an Application function server (AF) 107. The PCRF may for instance be a Service-Aware Policy Controller (SAPC). The P-GW is a gateway to a packet data network (PDN) 110, for instance an intranet or Internet. The user equipment may be for instance a terminal, mobile/cellular phone, smart phone, pocket digital assistant (PDA), tablet computer, laptop, or personal computer, or optionally a combination of these, e.g. with a terminal equipment tethered device (TE) such as a laptop 105 communicating via a smart phone 101 with the network. It should be noted that other network elements/nodes may be used in the communication process, for instance routers, switches, network cabling and so on for transporting data and control traffic; furthermore, other logical/physical nodes are involved in the communication process depending on network configuration, such as mobility management node, e.g. a mobility management entity (MME), charging policy and enforcement nodes, subscriber data nodes, location registers, and so on as understood by the person skilled in the art.

Figure 2:
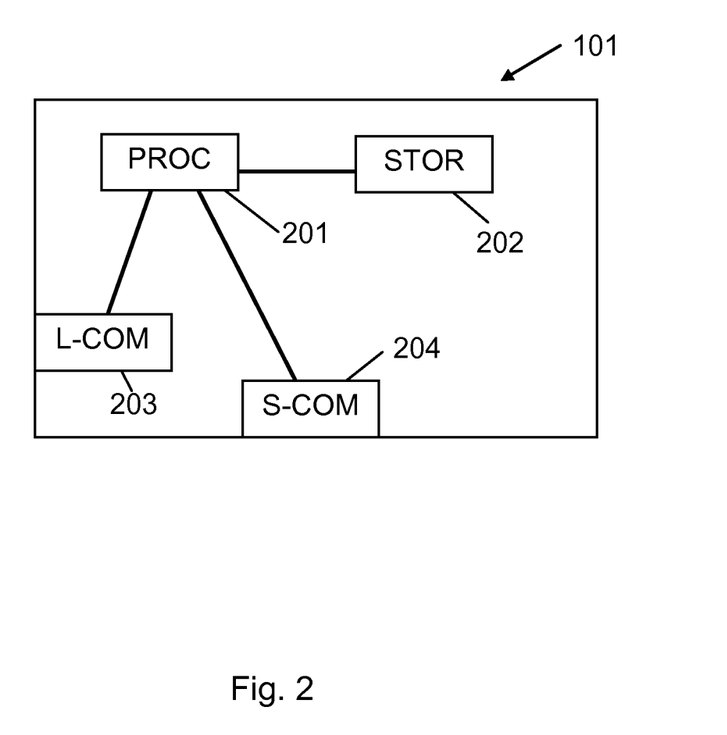
FIG. 2 is a schematic block diagram illustrating a network according to a second embodiment of the present invention.

The UE 101 comprise as is shown in FIG. 2, at least one processing unit (201) (PROC), at least one memory unit 202 (STOR) connected to the processing unit, and at least one long range communication interface 203 (L-COM) and optionally one or more short range communication interface 204 (S-COM) each connected to the processing unit. The L-COM may be of any suitable wireless communication type, such as for instance 2G, 3G, 4G, or a combination of these. The S-COM may be a fixed or wireless communication interface, for instance a USB connection, Wi-Fi connection, or a Bluetooth connection connecting external devices, called tethered devices, such as a laptop as shown in FIG. 21. The processing unit may be of any suitable type, such as a microprocessor, digital signal processor (DSP), application specific integrated circuit (ASIC), a field programmable gate array (FPGA), or combinations of these; for instance in some devices the processing unit comprise two processors working in parallel with different tasks for speeding up the user interface experience, e.g. one processor may handle control and data traffic issues and one processor may be arranged to handle graphical user interface issues. The processing unit is arranged to operate instruction sets stored in the memory unit as software in the memory unit which is a of a computer readable storage medium type. The memory may comprise any suitable type of volatile and/or non-volatile type or combinations of these built in and/or as an external memory card; for instance RAM, flash memory, electrically erasable memory (EEPROM), solid state drive (SSD), hard drive (HD), and so on. The instruction sets handles the communication control and data traffic and also the user interface of the UE and so on. During attachment to the data packet network an IP address is provided to the UE in order to being able to communicate with a data packet network; the attachment procedure may be of any suitable type in relation to type/mode of communication, e.g. 2G, 3G, or 4G network technology and follows standard procedures as defined in respective standardization documentation. 2G or 2.5G may for instance be GSM, GPRS, EDGE, or HSDPA based, 3G may be UMTS, WCDMA, CDMA2000, and 4G may be LTE or WiMAX based.

The UE may be arranged to register on the telecommunications network and receive charging information and with this information decide whether or not to receive downlink data or how often and/or the amount of data to receive.

The UE may optionally be operated to communicate with an external tethered device using the S-COM interface, such as a laptop, and arranged to transfer data between the external device and the base station and the packet data network. The UE may be arranged to detect or determine if the external device has stopped to operate or is not to receive downlink data for some time, e.g. due to being in a sleep mode or being inactive for some time. The UE will in such a situation indicate to an infrastructure device, e.g. the S-GW 103 that no downlink data is to be sent downlink to the UE for the external device. Similarly, the UE may determine that itself has no interest to receive downlink data for some time and may then similarly indicate that no downlink data is to be provided from the data packet network.

The UE may also be arranged to determine that no downlink data is to be received due to other resource management reasons, e.g. battery consumption in the UE or the external device connected to the UE.

However, in some cases it is of interest to continue to receive some information and block only some types of information. This can be done on a per application basis, for instance blocking html responses related to an internet browser but allow email messages to be received. Such a blocking feature can be set up in the core of the infrastructure network and invoked by the user through the user equipment or set up automatically when certain criteria is fulfilled, e.g. when roaming in an external network only certain applications can be set up to be allowed to be received in order to reduce roaming costs which can be expensive in some roaming scenarios. The feature may be arranged to either block some types of services or to allow some types of services, therefore some suitable node in the core network or the UE itself is arranged to filter the services in communication with the UE.

In a first embodiment a suitable protocol may be used by the UE to instruct a core node in the network which data or applications to filter data for. This may either be part of a control traffic message comprising other control data or be a separate message to define which data that shall be allowed or blocked before sending a message indicating start of filtering data.

In a second embodiment information related to type of data waiting to be sent downlink may be comprised in a paging request; i.e. a request from the infrastructure network that informs the UE that it has data to receive, of the IP packet that triggers the paging request. The UE then has a list with which type of IP packets it accepts or rejects the paging request if the triggering IP packet depending on the status of the service or type in the list, e.g. if the downlink data packet indicated in the paging request is of a type that is to be blocked the UE rejects the paging request but if the data packet is of a type that is to be allowed the UE accepts the paging request.

The embodiments may be set up for instance as filtering out all but some types of data and this may be set up by the network or selected by the user; for instance the user may select services for which data is to be received in a user friendly graphical user interface.

Figure 3:
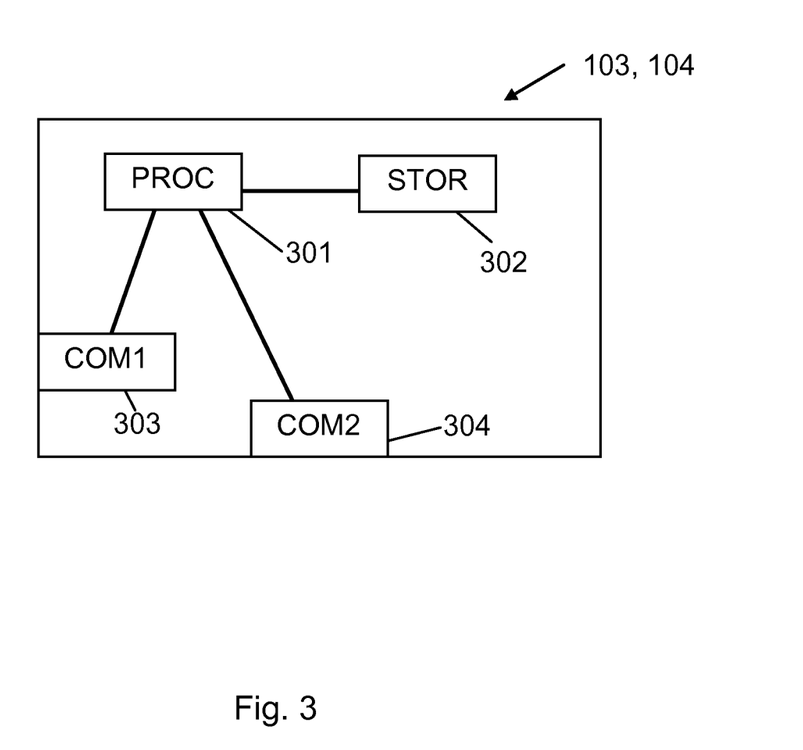
FIG. 3 is a schematic block diagram illustrating an exemplary device according to the present invention.

A core network node, such as for instance the S-GW 103 or P-GW 104 generally comprise as is shown in FIG. 3, at least one processing unit 301 (PROC), at least one memory unit 302 (STOR) connected to the processing unit, and at least one communication interface 303 and 304 (COM1 and COM2) each connected to the processing unit. The communication interfaces are arranged to communicate with for instance other infrastructure nodes, indirectly with the UE, and the packet data network.

The processing unit is arranged to operate instruction sets stored in the memory unit as software in the memory unit which is computer readable. The processing unit is arranged to receive and transmit control and/or data packets using the at least one communication interface. The processing unit is arranged to control data flow within the core network node between the memory and the communication interfaces and within the processing unit itself depending on functionality operated. The communication interface has been exemplified with two physical interfaces; however, it should be understood that it could be one physical interface or more than two physical interfaces depending on configuration; for example the communication interface may comprise an Ethernet interface or an asynchronous transfer mode (ATM) interface. The processing unit may comprise for instance a micro processor, an application specific integrated circuit (ASIC), digital signal processor (DSP), or field programmable gate array (FPGA).

The memory unit may comprise any suitable volatile and/or non-volatile memory in a single unit or as a combination of units, the memory may comprise for instance a solid state memory, e.g. SSD, a random access memory (RAM) of any type, a hard disk (HD), flash memory, and so on. It should be noted that different core network nodes basically comprise similar units and interfaces as described above in relation to FIG. 3; however with other instruction sets for operating different types of functionality.

The UE may be arranged to determine which downlink data that is to be sent to it, and thus a method handling this is implemented in the UE with corresponding response method in one or several infrastructure nodes as will be discussed below:

The UE is thus arranged to;
Determine that some downlink data is to be filtered; this may be initiated by the user of the UE or an external device connected to the UE when it is inactive, and
indicate in a signalling message, in a downlink indication, to one or several suitable infrastructure nodes, e.g. S-GW, P-GW, PCRF, or similar nodes, that some downlink data is to be sent downlink to the UE or the external device connected to the UE.

The infrastructure node may then be arranged to handle this indication in an appropriate manner depending on network configuration and filtering downlink data accordingly.

In a non roaming scenario the filtering downlink data indication may be sent to a serving gateway, for instance an S-GW in a 3/4G network or an SGSN in a 2/2.5G network and the serving gateway is then arranged to filter some downlink data traffic as indicated. Alternatively, the P-GW or PCRF is involved in filtering downlink data. Such an implementation requires a moderate level of amendment to standardizations. For instance, an information element may be added to a suitable control message used between the UE and the infrastructure node, e.g. a DoNotSendDLData, DoFilterSendDLData, or DoSendDLData information element; the DosendDLdata information element may be used if or when the UE or the connected external device wants to assume downlink data traffic again, for instance if the user becomes active again.

However, in a roaming scenario the solution where the stop downlink data indication is provided to the serving gateway may still mean that data is sent downlink from a packet data network gateway, e.g. a GGSN for a 2/2.5G and a P-GW for a 3/4G network, and possibly, traffic costs may be incurred on to a communication subscription related to the user or to the UE. Therefore, it is beneficial to control the packet data network gateway (P-GW) due to charging issues, i.e. preferably the serving gateway may signal the packet data network gateway with an indication to filter some downlink data traffic associated with the IP number associated with the UE.

Alternatively, the UE may be arranged to send the filter in some downlink data indication directly to the packet data network gateway, e.g. the P-GW. This may be implemented with several different types of solutions.

Figure 4:
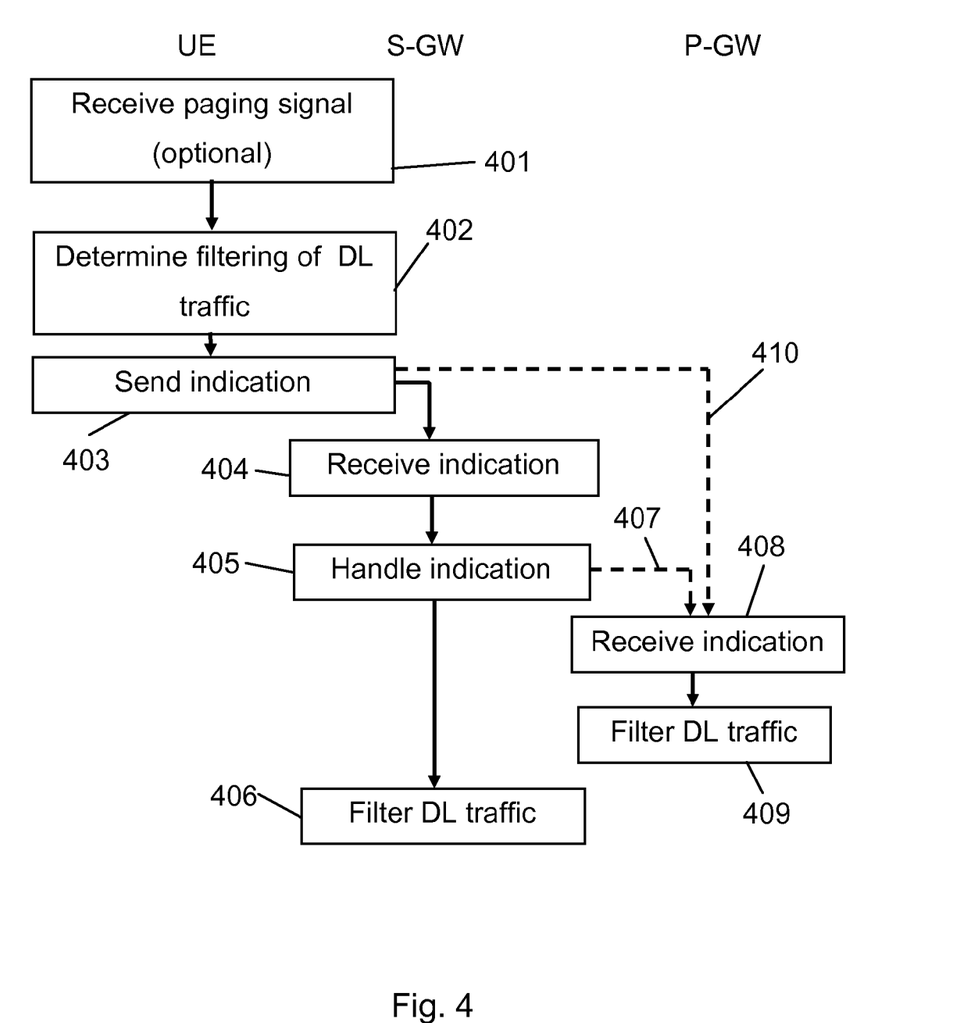
FIG. 4 is a schematic block diagram illustrating a method according to embodiments of the present invention.

These different scenarios and their inter-relations are illustrated in FIG. 4 describing method steps of some of the embodiments, wherein in step:

401. The UE may optionally receive a paging signal or a similar signal related to connection management of the UE to the network from a serving gateway or similar infrastructure node. This paging signal may comprise charging information and/or other information related to the connection to the network of interest for determining if the UE is of interest to receive downlink data. The processing unit may thus be arranged to execute instruction sets for receiving the paging signal from the infrastructure node and in response to the paging signal send a message indicating acceptance or no acceptance for receiving downlink data as will be discussed below in relation to step 403. The user equipment may send a message indicating that only some downlink data is to be transferred and the message indicating that the UE will decline paging requests from some applications or for some message types.

402. The UE determines if downlink data is to be received. This determination may be based in charging information, the status of any external device connected to the UE, the behaviour of the user of the UE, e.g. the user has been inactive for some period of time, battery status of the UE, and or a combination of these scenarios. For instance if the UE is connected to a roaming network where charges are incurred for data traffic, the UE may decide that only some downlink data is to be sent in order to reduce costs, or if the user of the UE has not been active using the UE for a certain time, the UE may determine that there is no interest to receive some downlink data but restrict downlink data to some high priority types of data; e.g. high priority for the user, or the UE may determine that there is no interest to receive downlink data in general, and therefore activate the filters in the network.

403. If the UE determines that only some downlink data is to be received, the UE sends an indication to an infrastructure node with information that only some downlink data is to be sent to the UE. The indication may for instance be an information element in a control data message, such as for instance a fast dormancy signal, e.g. used in a UMTS 3G network. Optionally, the UE may respond to the paging signal indicated in step 401 with a response that it will only receive some DL data.

404. In one of the embodiments the infrastructure node is a serving gateway which receives the indication, and

405. the infrastructure node handles the indication in a suitable manner as will be discussed below in further steps of the method.

406. If the infrastructure node is a serving gateway it may optionally invoke instruction sets for filtering some downlink traffic to the UE, and further optionally send an acknowledgement that this will be done; or

407. further optionally, the serving gateway may send an indication that some downlink data traffic is to be filtered to a packet data network gateway.

408. The packet data network gateway receives the indication that some downlink data is to be filtered; and

409. the packet data network gateway invokes instruction sets for stopping some downlink data traffic and for handling charging issues so the user will not be charged for unnecessary costs. This is beneficial for the subscriber since roaming costs or data traffic costs may be reduced in a convenient manner, i.e. at a point of measuring such charge incurred data traffic.

410. In another embodiment, steps 408 to 409 may be invoked by receiving the indication from the UE with information that only some downlink data is to be sent to the UE.

In this manner the UE will not receive downlink data that the user is not interested in and thus reduce costs incurred for instance in a roaming scenario however retaining the allocated IP address and therefore able to send uplink (UL) data when so wanted.

In order to allow the UE to selectively receive some data, the UE has to include information of what data to allow as part of some suitable signalling with network. However, the signalling to define which data that may be allowed may be comprised in a control message together with some other control data or may be comprised in a separate signalling message. Hence this solution has two variants, one where the UE signals filter definitions separately and then applies the filter and one where filter definitions is part of the request to apply the filter. The signalling may for instance be realized using 3GPP control signalling via SGSN/MME or using user plane signalling to some node in the network.

The information that constitutes the definitions of the filter is probably one or several IP 5-tuples, but other types of information may also be possible, for instance HTTP headers or any data flow pattern.

Implementation of the filter setup in UE may be an agent in an Application (App), in an operative system (OS), or firmware (FW) below OS. The implementation may alternatively be as an Application programming interface (API) towards third party App's The end user may be able to choose applications/services for which the filters may be set. This can be done by listing all available services/apps in the UE that has a filter associated with it in the network/user's subscription; and then the user just chooses from the list which functions or services that is to be filtered with immediate action or those functions/services that may be available when a certain trigger is activated. Alternatively, a core network node may be arranged to determine which functions/services that may be filtered depending on for instance roaming scenario, time of day, amount of UEs connected to a network, and so on.

Trigger for activating filters may be done by UE or the network. In the UE, for instance, triggering may be activated when UE is roaming, enter sleep state or manually triggered or activated by the user of the UE and the trigger may be sent to a node in the network sending IP packets on the user plane.

Triggering may also be part of 3GPP network signalling such as Fast Dormancy or when radio access bearer (RAB) is taken down in the S-GW. In these cases the Nodes (MME or SGW) has to communicate to the node in the network that activates the filter, e.g. the PCRF, that the filters is to be activated.

De-activation may be performed by the UE app, for instance by sending a message with information for deactivating filters when a certain criterion is fulfilled; for instance the criterion may be UE coming out from sleep mode and WWAN is used by user, UE becomes non-roaming, the filter is manually de-activated by user, or a combination of these.

Figure 5:
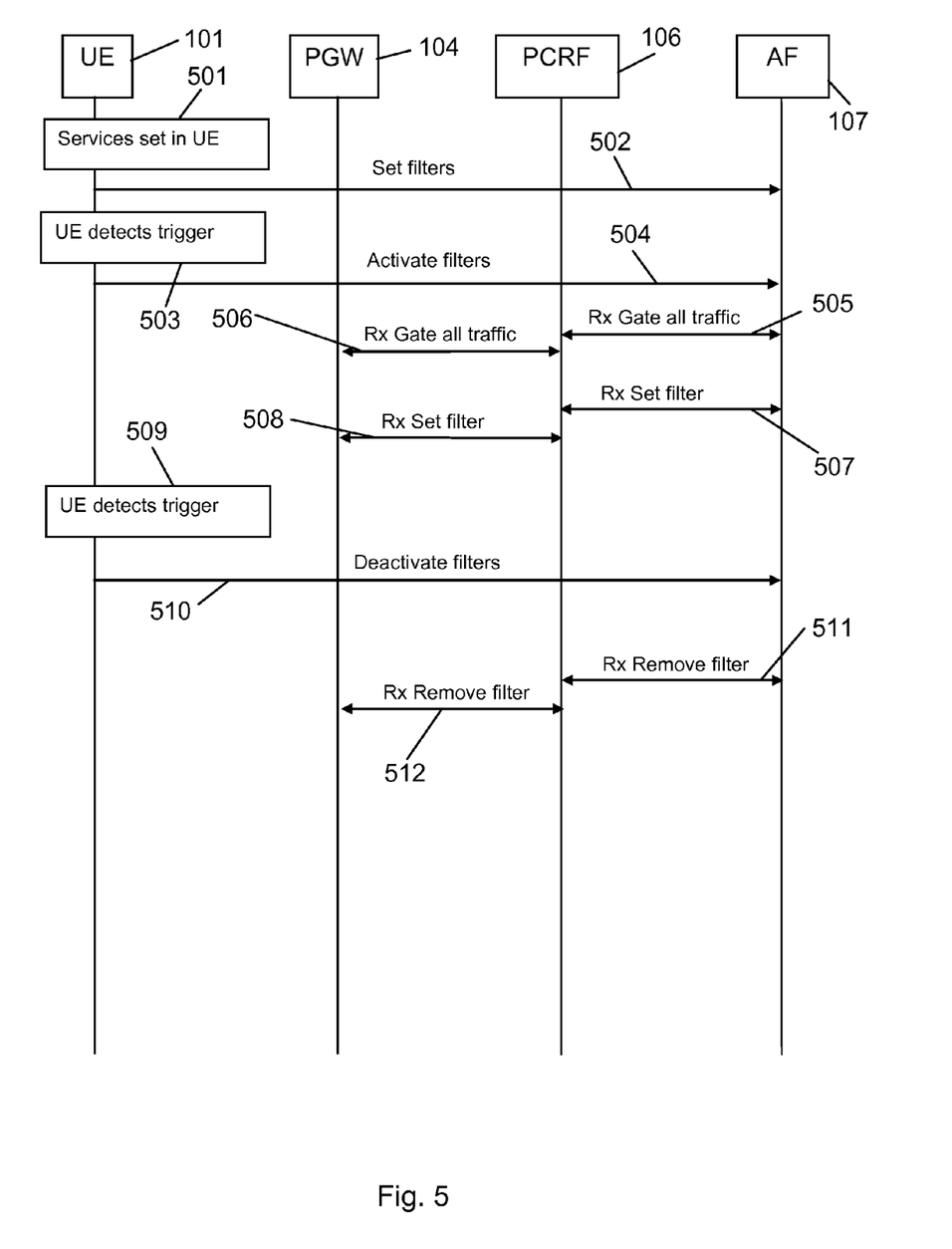
FIG. 5 is a schematic signalling diagram illustrating a method according to embodiments of the present invention.

FIG. 5 shows a sequence diagram for the first variant of this solution, giving an example of how the functionality may be implemented. An example of different nodes involved is shown in FIG. 5, for instance the UE 101, the P-GW 104, the PCRF 106, and the Application Function server (AF) 107. In this case there is a separate server in the network that functions as an application function (AF) and which has an Rx interface to the PCRF in the network.

In step 501 the user selects which services he/she wants to be able to access the UE e.g. when roaming. This may be done in different manners, for instance by choosing each service manually from a list in a user friendly graphical user interface; i.e. choosing services to allow downlink data transfer or choosing services to block downlink data transfer. Alternatively, the user chooses a pre-configured set up where service filtering has been set up for, for instance for different network situations or user situations such as in a roaming scenario or when the user is in a situation where he/she does not want to be disturbed unnecessarily.

In step 502 the UE communicates with the AF, this may be with user plane IP signalling, defining the filters that have been set up in the UE for which services to disable or enable downlink data transfer for.

In step 503 there is a trigger for the UE to activate the filter, e.g. that the UE starts roaming or the user chooses to start the filtering of downlink data transfer due to a change in his/her situation.

In step 504, the UE informs the AF about this trigger by sending a message with such information. This can be done for instance by sending information comprising a set of IP 5 tuples.

Based on this trigger the AF may optionally start to communicate with the PCRF over the Rx interface. A possible way to implement the Rx communication is to first have one Rx message that says that all traffic shall be blocked; this message would then be propagated over Rx to the PGW. These are steps 505 and 506 in FIG. 5; step 506 communicates information in relation to Gate all traffic to the PCRF with appropriate acknowledgement messages(s) shared and in step 507 the PCRF informs accordingly to the P-GW together with appropriate acknowledgement signalling.

Then as a second part the AF sends another Rx message requesting some services to be unblocked which is then sent further to the PGW (steps 507-508). Information in the request may for instance comprise IP 5 tuples, IP patterns, HTTP headers, HTTPS headers, FTP headers, and so on. If IP 5-tuples are used to identify the services, this is already supported on Rx today facilitating implementation. However, it should be understood that the AF may directly inform the PCRF, which subsequently informs the P-GW, with information about services to not block or to block without the steps of 506 and 507. This completes the activation of the filters.

At a later point in time, something triggers 509 the deactivation of filters and a deactivate filter message will be sent 510 from the UE to the AF with subsequent remove filter messages sent 511 and 512 downlink to the PCRF and P-GW.

If the filters sent from UE to Application Function Server are intended to block (instead of open up) certain services then a flag indicating the filters are blocking filters may be sent; then Gate all traffic (step 505 to 506) is not sent. Furthermore, at step 507 and 508, set dynamic gating filters advantageously include information to block (instead of open up) the 5-tuples, HTTP headers, IP patterns, and so on depending on type of traffic to block or allow downlink data traffic for.

Figure 6:
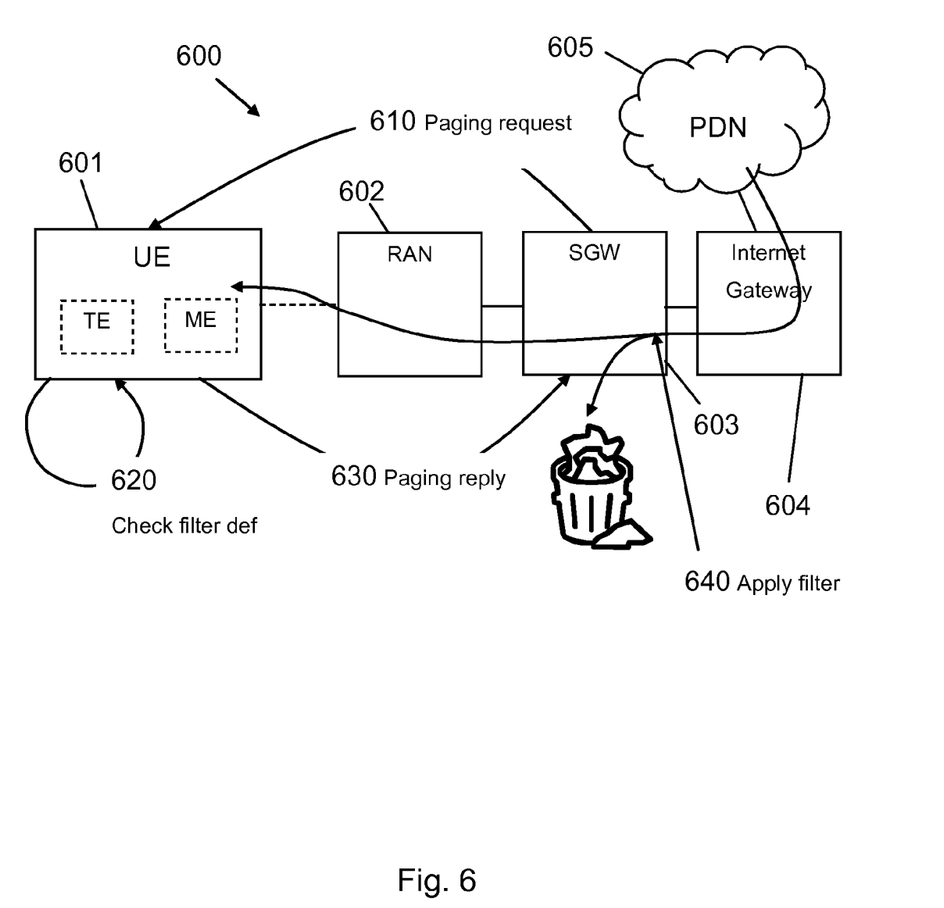
FIG. 6 is a schematic block diagram illustrating a network according to embodiments of the present invention.

In a second embodiment, shown in FIG. 6, which is step 401 option from FIG. 4 in more detail, with a UE 601 communicating wirelessly with a Radio area Network (RAN) 602 connected to a S-GW 603 in turn connected to a Packet data network gateway, e.g. a P-GW 604, connecting the telecommunications network 600 to a packet data network 605 (PDN), e.g. the Internet. In the second embodiment a paging or paging like request is sent 610 to the UE for informing the UE that there is data available to be transferred. In order to allow the UE to selectively accept some downlink data by utilizing the response possibility to the paging request, the paging requests advantageously comprise some information of the data that causes the paging request, e.g. type of data, type of service or functionality related to the data, or some priority indication. The UE receives and analyse 620 this message and depending on policies in the UE for which data it accepts and not accepts and depending on this information decide whether to accept the request or not. The information about the data comprised in the paging request may e.g. be the IP 5-tuple information of the IP packet that triggers the paging request. The UE will then send 630 a paging reply with information about how to handle the downlink data in the S-GW, i.e. accept or not accept downlink data, which in turn will apply 640 the filter for the UE.

The UE and/or any external devices may reduce battery energy consumption and thus prolong the life time of the battery between each charging.

Furthermore, with this solution control and data signalling may be reduced in the network thus decreasing the load on the network.

It should be noted that the instruction sets for handling the present invention may be distributed to related nodes, e.g. the UE and the infrastructure node, as a computer program product distributed on any suitable type of storage media, e.g. a compact disc (CD), a digital video disk (DVD), a flash memory, a hard drive, a solid state disk, and so on, or distributed as a signal in a communication network, e.g. an IP based network connected to the node.

The packet data network gateway, e.g. the P-GW or GGSN, may be arranged with similar units as described in FIG. 3 for the serving gateway, e.g. processing unit, storage unit and so on. FIG. 3 may thus be used for illustrating the packet data network gateway. It should be noted that the packet data network gateway may be located physically in the same unit as the serving gateway.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

AF Application function server
DL Downlink
EDGE Enhanced Data rates for Global Evolution
eNB evolved Node B
EPG Evolved Packet Gateway
GGSN Gateway GPRS Support Node
GPRS General Packet Radio Service
GSM Global System for Mobile Communications
GW Gateway
HeNB GW Home eNode B Gateway
HeNB Home eNode B
HSDPA High Speed Downlink Packet Access
IP Internet Protocol
MME Mobility Management Entity
P-GW PDN Gateway
PCC Policy and Charging Control
PCEF Policy and Charging Enforcement Function
PCRF Policy and Charging Rules Function
SAPC Service-aware Policy Controller
S-GW Serving Gateway
SGSN Serving GPRS Support Node
TAU Tracking Area Update
TE Terminal equipment, tethered device
UL Uplink
UMTS Universal Mobile Telecommunications System

The invention claimed is:

1. A user equipment (UE); in a telecommunications network, with an associated Internet Protocol (IP) address, the UE comprising:
    at least one processor;
    at least one non-transitory computer readable storage medium coupled to the processor, and
    at least one communications interface coupled to the processor;
    wherein the processor is arranged to execute instructions sets stored in the storage unit medium for:
    determining services for which data is to be filtered on the communication interface;
    setting up a filter configuration comprising information about which services to filter; and
    sending a communication control message using the communication interface to an infrastructure node indicating the services to filter by providing the filter configuration to the infrastructure node.

2. The user equipment according to claim 1, wherein the processor is further arranged to:
    execute instruction sets for receiving a paging signal comprising information about a type of downlink data to be transferred from the infrastructure node,
    check a filter list in the UE, and
        in response to the paging signal, send a message indicating acceptance or no acceptance for receiving downlink data.

3. The user equipment according to claim 1, wherein the communication control message comprises a control message used for handling communication processes between the UE and the telecommunications network and the communication control message further comprising information related to the services to filter.

4. The user equipment according to claim 1, wherein a fast dormancy signal is used to transfer an indication to start filtering of downlink data by providing a flag indicating in the fast dormancy signal.

5. The user equipment according to claim 1, wherein the filter configuration comprises at least one of IP 5 tuples, IP patterns, hyper-text transfer protocol (HTTP) headers, or file transfer protocol (FTP) headers.

6. The user equipment according to claim 1, wherein determination of the services for which data is to be filtered on the communication interface is to be initiated by an external device connected to the UE.

7. The user equipment according to claim 1, wherein the infrastructure node is one of a serving gateway (S-GW) a packet data network gateway (P-GW).

8. The user equipment according to claim 1, wherein the processor is further arranged to activate filtering the services.

9. The user equipment according to claim 1, wherein activation of filtering the services is triggered by the UE starting roaming.

10. A method in a user equipment (UE) in a telecommunications network, wherein the UE has an associated Internet Protocol (IP) address, comprising steps of:
    determining that downlink data for services is to be filtered;
    setting up a filter configuration;
    sending the filter configuration to an infrastructure node as part of a communication control message;
    detecting a trigger event in the UE for starting of filtering of downlink data; and indicating to the infrastructure node, that the filter configuration is to be applied in the infrastructure node.

11. The method according to claim 10, wherein the trigger event is at least one of idle status of the UE, roaming of the UE, remaining battery charge, user activated, and network load.

12. The method according to claim 10, wherein the filter configuration comprises at least one of IP 5 tuples, IP patterns, hyper-text transfer protocol (HTTP) headers, or file transfer protocol (FTP) headers.

13. An infrastructure node in a telecommunications network, comprising:
    at least one processor;
    at least one non-transitory computer readable storage medium coupled to the processor; and
    at least one communications interface coupled to the processor;
    wherein the processor is arranged to execute instructions sets stored in the storage medium for:
    receiving a filter configuration in a communication control message from a user equipment (UE) associated with an Internet protocol (IP) address,
    indicating services to filter communication towards the UE; and
    filtering downlink data on a service level towards the UE in accordance with the filter configuration.

14. The infrastructure node according to claim 13, wherein the infrastructure node is one of a serving gateway (S-GW) a packet data network gateway (P-GW).

15. The infrastructure node according to claim 13, further comprising a step of receiving a trigger message from the UE indicating start of filtering of the services.

16. The infrastructure node according to claim 15, wherein the trigger message is one of a fast dormancy signal or a radio access bearer control message.

* * * * *